Figure 1:
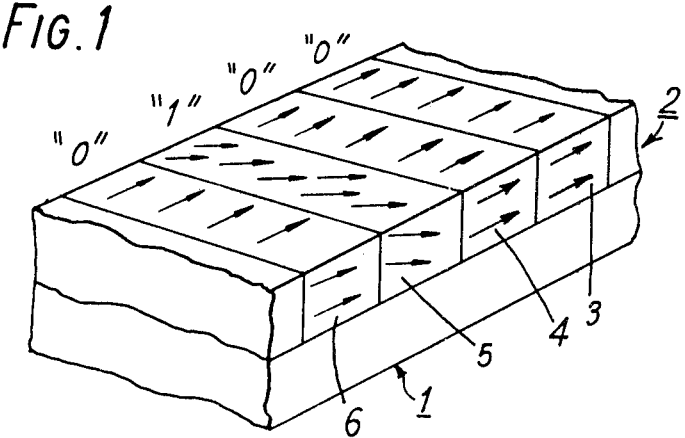
Figure 2A:
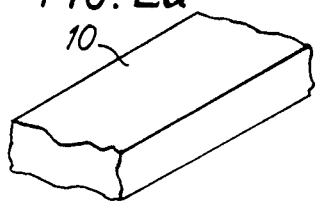
Figure 2B:
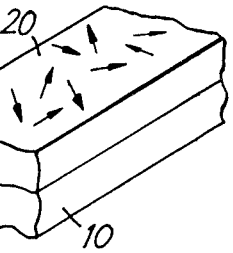
Figure 2C:
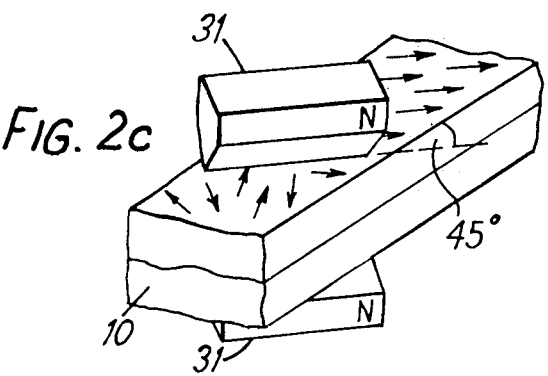
Figure 2D:
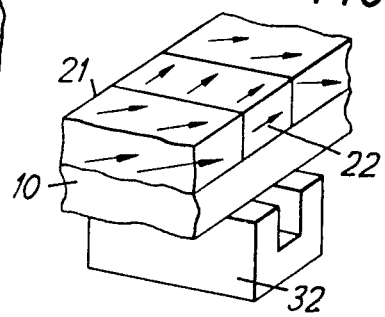
Figure 2E:
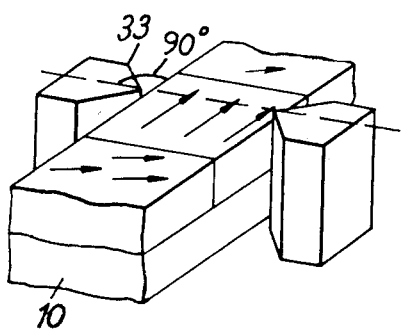
Figure 2F:
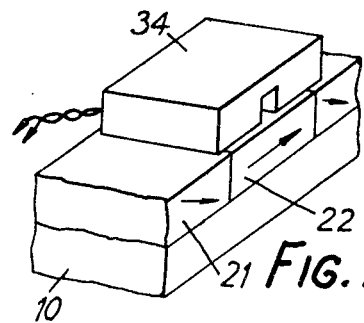

United States Patent [19]

Pearce

[11] 4,197,989
[45] Apr. 15, 1980

[54] MAGNETIC RECORDING

[75] Inventor: Ralph R. Pearce, West Drayton, England

[73] Assignee: EMI Limited, Hayes, England

[21] Appl. No.: 919,434

[22] Filed: Jun. 26, 1978

Related U.S. Application Data

[63] Continuation of Ser. No. 621,862, Oct. 14, 1975, Pat. No. 4,104,513.

[30] Foreign Application Priority Data

Oct. 16, 1974 [GB] United Kingdom ............... 44748/74
Jan. 29, 1975 [GB] United Kingdom ................. 3989/75

[51] Int. Cl.$^2$ ....................... G06K 7/08; G06K 19/06
[52] U.S. Cl. ........................................ 235/493; 360/2; 360/40; 360/134
[58] Field of Search ....................... 235/493, 449, 450; 360/2, 39, 40, 134

[56] References Cited

U.S. PATENT DOCUMENTS

| | | | |
|---|---|---|---|
| 3,117,065 | 1/1964 | Wootten | 235/493 |
| 3,465,307 | 9/1969 | Schmidt | 235/493 |
| 3,571,799 | 3/1971 | Coker, Jr. et al. | 340/152 |
| 3,634,797 | 1/1972 | Burkholter | 235/493 |
| 3,714,664 | 1/1973 | Fayling | 235/493 |
| 3,790,754 | 2/1974 | Black et al. | 235/493 |
| 3,873,975 | 3/1975 | Miklos et al. | 235/493 |
| 3,878,367 | 4/1975 | Fayling et al. | 235/493 |

FOREIGN PATENT DOCUMENTS 1331604 9/1973 United Kingdom .................... 235/493

*Primary Examiner*—Daryl W. Cook
*Attorney, Agent, or Firm*—Fleit & Jacobson

[57] ABSTRACT

Magnetic recording media including permanent structures of aligned acicular particles have been proposed as a means of identifying and authenticating a medium. A structure which has an improved remanence difference signal is described. A method of making and examining such a structure is described. Arrangements of such media and record/read-out apparatus by which information can be recorded and read-out without interference from the structural remanence differences are described. The use of the media for security documents such as credit cards is described.

13 Claims, 9 Drawing Figures

MAGNETIC RECORDING

This is a continuation of application Ser. No. 621,862, filed Oct. 14, 1975 now U.S. Pat. No. 4,104,513.

This invention relates to magnetic recording including permanent records, to media for such recording and methods of making, using and examining them and to security documents including such media.

The formation of a permanent magnetically readable recording by the alignment of the long axis of acicular particles in selected spaced regions of a single layer medium of a particulate magnetisable material has been proposed. Other regions of the layer are left unaligned or are aligned in a direction perpendicular to that of the selected regions. The selected regions can form a pattern by which information can be recorded on the layer. As the pattern is formed during manufacture of the medium it can be considered to be permanent in that alteration would involve damage to the medium.

Such a pattern is known as a magnetic "watermark" by analogy with the watermark formed in paper. The pattern can be detected and examined by magnetising the layer with a unidirectional magnetic field in one of the alignment directions which produces remanent magnetisation of the particles. The remanent magnetisation will differ in dependence on whether the particles are aligned with or across the field and a suitable magnetic sensor such as a read-out head will produce a signal indicative of these different remanence levels.

Permanent magnetic recordings as described above have been proposed for use in security documents to provide a means by which a genuine document can be identified by a machine action rather than a human one. The security document may be a credit card or a valuable paper such as a bond or security certificate or a identity card passport or key. The portion of medium may be bonded to the document or incorporated in it.

It is in general desirable that the remanence difference signal should be large and distinct to ease the examination of the record.

It is an object of the invention to provide an improved security document having such a medium.

It is also an object of the invention to provide an improved method of examining a permanent structured magnetic recording medium.

The term security document or security device includes a key, token, pass identity or credit card, passport, banknote, cheque, bond, or share certificate which inter alia is, represents or permits the access to or the transfer of possession of property or money or valuables or information or authorises the presence of a bearer of the document.

According to one aspect of the invention there is provided a magnetic recording medium of a body of magnetically anisotropic material including a pattern of a group of regions having a distinct permanent magnetic property of an easy axis of magnetisation of the material predominately aligned to a first selected direction and at least another region having an easy axis of magnetisation of the material of the region predominately permanently aligned to a second direction other than perpendicular to said first region.

According to another aspect of the invention there is provided a magnetic recording medium of a body of magnetically anisotropic material including a pattern of regions having a distinct permanent magnetic property of the predominant alignment of an easy axis of magnetisation of the material and another overlying region having a permanent predominant alignment of an easy axis of magnetisation of the material of the region.

According to the invention there is also provided a method of making a magnetic recording medium including providing an elongate support and a supply of a dispersion of a magnetically anisotropic material in a settable binder, coating a layer of said dispersion onto the support, applying throughout the wet dispersion a magnetic field to align an easy axis of magnetisation of the material substantially diagonally of the support, applying to selected spaced regions a magnetic field to re-align said easy axis of magnetisation of the material substantially along the support and causing the binder to set to fix the alignments of the material in the medium.

The invention further provides a security document including a medium as described above and a method and apparatus of examining security documents purporting to include a structural magnetic pattern.

Figure 3:
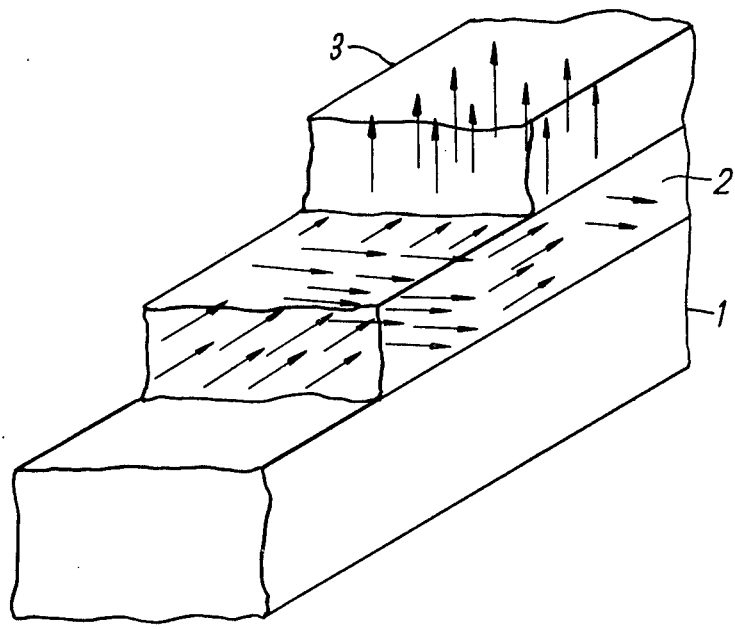
Figure 4:
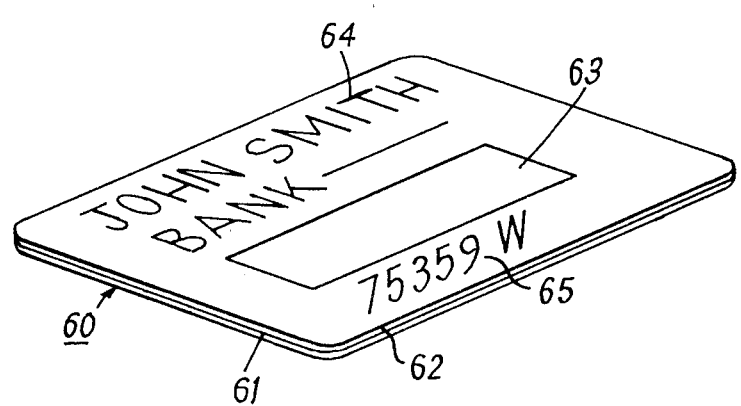

Embodiments of the invention will now be described with reference to the accompanying drawings in which:

FIG. 1 shows a portion of a magnetisable record in tape form and having a permanent magnetic structure, FIG. 2, consisting of FIGS. 2a-2f, shows stages in a method of making and examining such a medium in tape form, both figures having an exaggerated vertical scale, FIG. 3 shows portions of a further magnetisable record medium in tape form and having a permanent magnetic structure, and FIG. 4 shows a security document such as a credit card incorporating a portion of a magnetisable record medium.

Referring first to FIG. 1 the magnetisable member includes a base layer 1, which may be plastics material such as is conventionally used for magnetic recording tape, and a magnetically anisotropic magnetisable material 2 which may be a layer of acicular $\gamma Fe_2O_3$ particles. The particles of the layer have been arranged in a permanent structure by being aligned before the liquid part of a dispersion is removed to leave the particles as an adherent coating on the base. Aligning the easy axis of magnetisation of an anisotropic material and coating techniques as are well known in the art are suitable although a preferred method of maufacture is described below.

The permanent structure of the illustrated embodiment is such that the layer is divided into regions of two types those, e.g. 5, in which the long axis of the acicular particles and therefore the preferred axis of magnetisation has been aligned in a first direction coplanar with the layer and inclined at substantially 45° to a second direction also coplanar with the layer and those, e.g. 3, 4 and 6, in which the preferred axis has been aligned with the second direction. Other non-orthogonal inclinations may be used, and these need not be coplanar.

Each types of region can be assigned a different significance, e.g. a binary "1" or "0" as indicated in the figure.

The permanent structure can be examined by applying a magnetic field to magnetise the particles. Preferably the field, the developing or reactivation field, is applied in the plane of the layer and substantially at right angles to the second direction. The particles of region 5 develop a greater remanent magnetism than the particles of regions 3, 4 and 6 and this difference can be detected by an appropriately placed reading head to produce a series of signals as the member is moved past the head which signals can be interpreted as binary ones and zeroes as is well known.

The sequence of binary ones and zeroes as produced by the permanently structured magnetic layer indicates the form of the magnetic watermark and can be used to verify that the member, or any document or other article having the member in or on it, is genuine. The form of the watermark may also provide information in addition to verification.

FIG. 2 shows a sequence of operations in the making of magnetic medium as a strip of tape.

A base layer 10, of a plastics material such as a polyester in film form, is prepared (2a) and then coated with a dispersion 20 of acicular $yFe_2O_3$ particles in a binder and solvent such as is used for conventional magnetic recording tapes for use in domestic recording (2b). The particles will be randomly arranged in the dispersion at this stage. The base 10 and still wet coating 20 are passed between the poles of a magnet 31 which has a strength sufficient to effectively align particles throughout the tape predominately in a first direction which is preferably inclined at substantially 45° to the length of the tape being formed. This step is referred to as pre-orientation. The aligned particle layer 21 (2c) is then passed, while the coating is still wet and the particles still mobile, over a second magnet 32 which selectively exerts a field such as to align the particles along the axis of the tape.

The magnet 32 can be selectively operated, e.g. by pulsing a winding thereon, to only align some regions 22 of the layer 21 as the tape passes (2d). The dispersion is now dried fixing the particles in position either along or inclined to the tape length. The resultant tape has a permanently structured magnetisable layer structured in accordance with the operation or non-operation of magnet 32 and forming a pattern by having a distinct permanent magnetic property in a group of regions.

The particles used for domestic recording tapes have a longitudinal to transverse remanence ratio of some 1.7 to 2.0. When such particles are used in a watermark, such as disclosed in British patent specification No. 1331604, this ratio indicates that a signal level difference of some 5 dB between the longitudinally and transversely positioned directions of alignment is available to be detected.

When a tape made as described with reference to FIG. 2 from particles with a ratio of 1.8 is developed in an examining apparatus by being subjected to a transverse developing field (FIG. 2e) from magnet 33 the ratio of remanence in the 45° pre-oriented area to that in the longitudinal, data, area has been found to be about 7:1. This corresponds to a signal level difference of some 17dB available to detected by a reading head 34 with a gap across the tape length. This improvement is of great importance in that the two signals now have a much greater difference and are easier to detect reliably and economically.

A similar ratio of area remanences (7:1) is obtained with particles having a ratio of 3.3, i.e. in the range of 3 to 3.5 highly acicular particles. The ratio for such particles indicates an available signal level difference of 10dB for substantially orthogonal axes of alignment in structures such as are disclosed in British patent specification No. 1331604.

The members described above have been produced by laboratory techniques using hand-made dispersion coatings and vibrating sample magnetometer tests but similar improvements are obtainable in the production of magnetic material for security documents such as cheques, credit cards, passes and other uses. Other magnetic materials, e.g. $CrO_2$, may be used.

In using the structured layer to record binary information as the form of the watermark the first direction, inclined across the layer, is preferred for binary 1 leaving the second direction, along the layer, for binary 0.

Although the invention has been described in terms of a layer of magnetic material on a base clearly other forms of member could be used. Furthermore the two directions need not be both in the plane of the layer.

In particular the exposure of all the particles to a field to produce alignment in a first direction, preorientation, followed by exposure to a field other than substantially orthogonal to the first, and preferably at 45°, is believed to produce the improvement achieved by the procedure described above. The angle is preferably 45° as this has been found to produce the maximum improvement in signal difference. However a significant improvement is obtained over the range of 25° to 65° degree at least.

Referring now to FIG. 3 this shows a further record medium in tape form and having a permanent magnetic structure. This medium is arranged to have regions of the body of magnetically anisotropic material formed so that one overlies some others and the overlain regions form a pattern having a permanent distinct magnetic property known as the watermark. Clearly in use either the one "overlying" region or the "overlain" regions may be uppermost subject to restrictions, which will be apparent to those skilled in the art, of recording and readout from the respective regions. Accordingly these terms should be considered as identifying relative position when the body of material is in a chosen position.

The tape shown in FIG. 3 has two layers of magnetically anisotropic magnetisable material, 2 and 3, on a base 1. The base 1 may be any suitable material, such as paper or a flexible polyester or other plastic material layer, or a layer of a more rigid material suitable for use in a card of the "credit card" type.

Layer 2 is deposited on the base 1 by an appropriate method, such as coating with a dispersion of magnetic material particles in a binder. The particles are aligned before their positions are set by the drying of the coating. To make the tape shown in the drawing layer 2 is deposited on the base 1 by an appropriate method, such as coating with a dispersion of magnetic material particles in a binder. The easy axes of magnetisation of the particles are predominately aligned in a pattern if regions whilst the coating is fluid and then fixed in position by drying the material. Similarly layer 3 is deposited by coating, aligning and drying. The coatings are preferably calendered in a known manner. The arrows in the drawing indicate in a conventional manner the alignment of the magnetic axes in one embodiment.

Suitable particles for layer 2 are gamma $Fe_2O_3$ having an acicular shape while for layer 3 the particles could be of cobalt doped gamma $Fe_2O_3CrO_2$ or metal powders also having an acicular shape and preferably of higher coercivity than in layer 2. The coatings have their particles aligned so that in layer 2 some particles have their preferred axes of magnetisation set in each of two oblique directions, while in layer 3 they are aligned in a direction oblique to these two directions. The coatings may be arranged on base 1 as shown or in the reverse order. Preferably the three directions of the axes are orthogonal as shown in the figure.

However the oblique directions of layer 2 may be achieved by an arrangement such as has been described above the single layer of FIG. 1 replacing layer 2 of FIG. 3. The arrangement of the directions must be such that the alignment in regions forming the patterns is not detectable when the "overlying" region has been magnetised to record information and is examined by a readout head or the like to recover the information. Any remanent magnetisation in the pattern will have a steady value throughout the pattern to achieve this and alignments are chosen accordingly.

Examples only of these alignments have been given.

In use of the medium the particles in layer 2 form a permanent magnetic pattern which can be revealed by a developing operation of magnetic saturation or demagnetisation and then controlled magnetisation to produce a remanence pattern. Layer 3 may have information recorded on it and updated by an appropriately directed magnetic field which will not extend to affect the layer 2, nor will layer 2 affect the reproduction of information from layer 3 by an appropriately directed reproducing head. As the coercivity of layer 2 is less than that of layer 3 it is also possible to develop the watermark without destroying information recorded.

The medium as described above is most suitable for use in the provision of permanently authenticated but revisable information for security documents such as credit cards. The information recorded cannot be tampered with unless apparatus very similar to that designed for use with the cards etc., using the medium, is available. In particular the use of "perpendicular" recording for layer 3 makes tampering difficult as this recording method is most unusual and is both difficult to perform and not likely to be detected readily in casual attempts to tamper with the card. Also the use of high coercivity material makes recording more difficult. The pattern can be of low coercivity material as the permanent pattern is immune from magnetic attack and only physical damage will affect it.

Thus, by way of example, FIG. 4 shows a security document in the form of a credit card 60. Such a card is formed of two layers of plastics material, 61 and 62 respectively, laminated together. A body of magnetic recording medium 63 is secured to the card by, e.g. hot blocking a piece of medium from a tape substrate onto the card laminate. Printed or other readable information may be applied to the card as at 64 and/or 65.

The body of medium 63 has a permanent magnetic structure from which the authenticity of the card can be verified and the body 63 can also form a record medium for information which is magnetically recorded on the medium for use at a transaction station. The information may be revised when required as described above. By arranging the medium as described above the information and verification can be recorded in the same body of medium in superimposed relationship. This can lead to a reduction of the area of magnetic material on the card which if expensive materials are required can be a significant point. Also the superimposition of the information and verification provides some extra protection in that tampering with one is likely to affect the other and be detected at a transaction station.

What I claim is:

1. A magnetizable recording medium of a body of magnetically anisotropic material, the structure of the body including a pattern of a first group of regions all having a distinct permanent magnetic property of an easy axis of magnetization of the material predominantly permanently aligned to a first selected direction and the remaining regions in the structure of the body having an easy axis of magnetization of the material predominately permanently aligned to a second direction, the first and second directions being substantially non-orthogonal.

2. A medium according to claim 1 in which said first and second directions are in the plane of a layer of said material and inclined at between 25° and 65°.

3. A medium according to claim 2 in which said layer is elongate and one of said directions is along the length.

4. A security document including a magnetic recording medium of a body of magnetically anisotropic material including a pattern of a permanent magnetic property as claimed in claim 1.

5. A security document as claimed in claim 4 and including a revisable information store in said another region readable without interference from said pattern.

6. A magnetisable recording medium of a body of magnetically anisotropic material including a pattern of regions having a distinct permanent magnetic property of the predominant alignment of an easy axis of magnetisation of the material to different directions in different regions of the pattern and another overlying region having a permanent predominant alignment of an easy axis of magnetisation of the material of the another region in a further direction in a plane other than that of said different directions.

7. A medium according to claim 6 in which the regions forming the pattern and the overlying regions are of different coercivity.

8. A medium according to claim 7 including a non-magnetic region between the regions forming the pattern and the overlying regions.

9. A medium according to claim 6 in which the pattern of regions is formed by respective alignments of the easy axis of magnetisation is in each of two groups of regions and the alignment in the overlying region is perpendicular to both said respective alignments.

10. A medium according to claim 9 in which the regions forming the pattern are of lower coercivity than the overlying region to permit development of the watermark and erasure of the developed signal without affecting information recorded on the higher coercivity overlying layer, the respective alignments not producing any remanence variation signal in the alignment direction in the overlying region.

11. A security document including a magnetic recording medium of a body of magnetically anisotropic material including a pattern of a permanent magnetic property as claimed in claim 6.

12. A security document as claimed in claim 11 and including a revisable information store in said another region readable without interference from said pattern.

13. A method of making a magnetisable recording medium including providing an elongate support and a supply of a dispersion of a magnetically anisotropic material in a settable binder, coating a layer of said dispersion onto the support, applying throughout the wet dispersion a magnetic field to align an easy axis of magnetisation of the material substantially diagonally of and not more than 65° off the length of the support, applying to selected spaced regions a magnetic field to re-align said easy axis of magnetisation of the material substantially along the length of the support and causing the binder to set to fix the alignments of the material in the medium, the alignments being substantially non-orthogonal.

* * * * *